May 21, 1968 E. B. CONNELLY 3,383,723

EXPANDING MANDREL FOR MACHINING PIPE ENDS

Filed Oct. 14, 1966 2 Sheets-Sheet 1

INVENTOR
EUGENE B. CONNELLY

By Donald G. Dalton
Attorney

EXPANDING MANDREL FOR MACHINING PIPE ENDS

Filed Oct. 14, 1966 2 Sheets-Sheet 2

INVENTOR
EUGENE B. CONNELLY
By Donald G. Dalton
Attorney

United States Patent Office 3,383,723

Patented May 21, 1968

3,383,723

EXPANDING MANDREL FOR MACHINING PIPE ENDS

Eugene B. Connelly, Churchill Borough, Pa., assignor to United States Steel Corporation, a corporation of Delaware Filed Oct. 14, 1966, Ser. No. 586,753
3 Claims. (Cl. 10—107)

This invention relates to apparatus for turning and threading pipe and, in particular, to a mandrel adapted to enter the pipe end and support it against externally applied forces.

When a pipe length having a relatively thin wall is threaded, for example, by a pipe-threading machine where the tools are rotated, the pipe wall may yield under the pressure of the cut and then spring back after the cutting tool has passed. This yield and springing back are erratic and unpredictable, being influenced by variations in wall thickness, metallurgical properties, cutting geometry of the tooling, pipe ovality, straightness, or the like. Additionally, a pipe end is held stationary by a chuck. Although the pipe is usually not perfectly circular, it is elastically deformed to a circle by the chuck. When the chuck opens, after threading, the pipe end returns to its normal shape. Under one or more of the described conditions a pipe thread may not meet the gage size and taper requirements at all points.

I have invented an improved mandrel for use with pipe-threading machines, which expands when inserted in a pipe end to the extent permitted by engagement with the pipe wall, and resists radial forces tending to change the shape thereof. Thus, by the use of my mandrel a completed thread will be circular and will conform to the gage size and taper required, despite an oval or non-round pipe-end interior, variation in wall thickness, a bent pipe end, gripping by a chuck or the like.

In a preferred embodiment, my improved mandrel comprises a cylinder or hub and a telescoping sleeve on a thruster, both coaxial with the hub. The hub has circumferentially spaced axial slots for wedges slidable axially therein. Fingers having sliding engagement with the wedges are radially movable in radial extensions of the axial slots outwardly through the hub. Compression springs normally cause the wedges to move axially and the fingers to move radially outwardly. The thruster or piston rod bottoms in the sleeve and a flange on the sleeve is adapted to engage the wedges and thereby to move the fingers radially inwardly. Fluid pressure cylinders are provided to reciprocate the mandrel and thruster respectively.

A complete understanding of the invention may be obtained from the following detailed description and explanation which refer to the accompanying drawings illustrating the present prefered embodiment. In the drawings.

Figure 1:
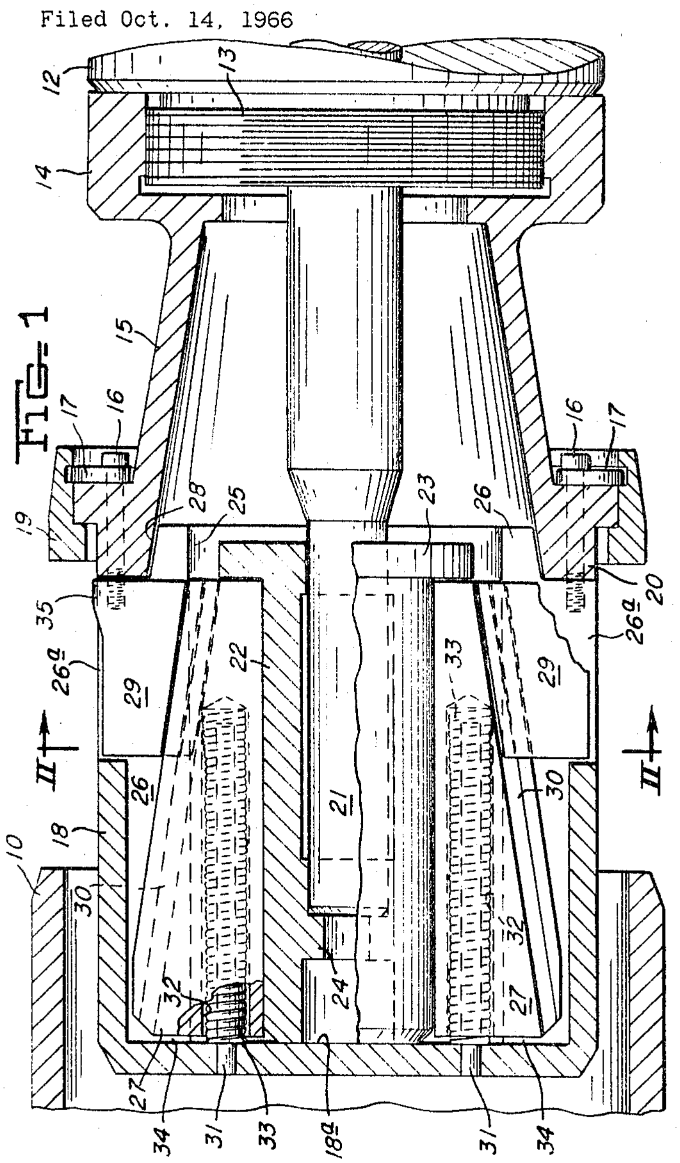
FIGURE 1 is a side elevation, partly in section, of an expanding mandrel according to my invention, showing the relative position of the parts thereof prior to entry into a pipe end.
Figure 2:
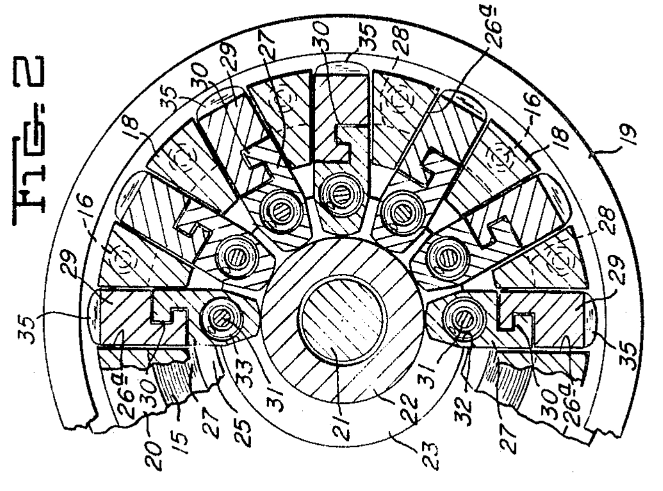
FIGURE 2 is a partial vertical section taken along the line II—II of FIGURE 1.

Referring now in detail to the drawings and, for the present, to FIGURES 1 and 2 particularly, the apparatus there shown is mounted on the frame of a pipe-threading machine for cooperation therewith. By means to be described hereinafter, the apparatus is reciprocable longitudinally and as shown in FIGURE 1 it moves to the left for entry into and cooperation with the end of a pipe length 10, held stationary by the jaws 11 of a chuck (FIGURE 5) of the threading machine.

The mandrel assembly of FIGURE 1 is supported by a sleeve 12, threaded at end 13 thereof for engagement with a recessed, threaded end 14 of a collar or adapter 15. Circumferentially spaced bolts 16 and oblong washers 17 serve to mount a mandrel hub or cylinder 18 and an annular shoulder 19 on the opposite end 20 of adapter 15.

By means to be described hereinafter, a thruster or piston rod 21, coaxial with hub 18, is reciprocable longitudinally thereof in sleeve 12. A telescoping sleeve 22 is mounted coaxial with and slidable on the left-hand end of thruster 21. Sleeve 22 has an external flange 23 at one end thereof and an internal flange 24 near the opposite end, adapted to engage the forward (left-hand) end of thruster 21. From the right-hand end, hub 18 is cylindrically bored, axially inwardly at 25 to wall 18*a* of the hub to permit axial movement of sleeve 22 therethrough.

Figure 3:
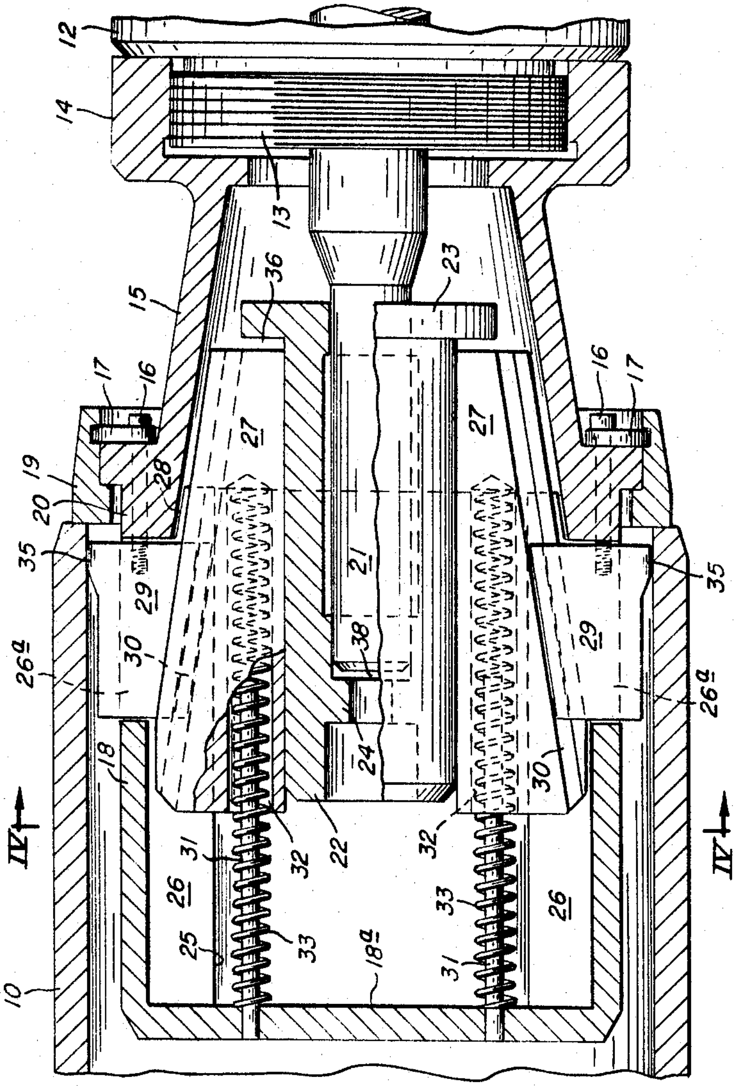
FIGURE 3 is a view similar to FIGURE 1 showing the mandrel expanded in a pipe end.

From its right-hand end, the interior of hub 18 has substantially rectangular axial slots 26 spaced circumferentially thereof, extending axially inwardly to wall 18*a* of the hub. Slots 26 extend radially inwardly to bore 25. In FIGURES 1 and 3, slots 26 in the facing surface of bore 25 have been omitted for clarity. Near the right-hand end of hub 18, slots 26 extend radially outwardly through the periphery of the hub as slots 26*a*. Wedges 27 extend axially through slots 26, the inner edges thereof being in engagement with sleeve 22. The right-hand edges of the wedges are adapted to be engaged by flange 23. The right-hand end of hub 18 has an annular ring of metal removed therefrom to center adapter 15 thereon and to permit end 20 to abut thereagainst. The resulting outer conical surface 28 of hub 18 mates with a portion of the inner surface of end 20. Fingers 29 having a generally rectangular horizontal cross section, extend radially through and are slidable in slots 25 and 26*a*. The outer vertical face of end 20 abutting hub 18 serves as the fourth side of slots 26*a* to contain fingers 29. The inner edges of fingers 29 are in sliding engagement with the outer edges of wedges 27, illustrated in FIGURE 2, as tongue and groove joints 30. The outer edges of wedges 27 are formed in the wedges at an acute angle, preferably between about 6° and 12° (smaller than the angle of repose for machined steel) to the axis of the hub. Circumferentially spaced pins 31 mounted in wall 18*a* of the hub extend axially inwardly into recesses 32 in wedges 27 and support compression springs 33 thereon.

When the parts are in the positions shown in FIGURES 1 and 2, the mandrel assembly is being moved to the left into pipe end 10. Thruster 21, bottoming in sleeve 22, preferably against flange 24, has moved sleeve 22 to the left into abutting engagement with wall 18*a*. Flange 23 causes all wedges 27 to move axially to the left in the hub against the force of compression springs 33, thereby moving fingers 29 radially inwardly in slots 26*a* into contracted position. In this contracted position of the mandrel assembly it is preferred to maintain a small clearance space 34 between the wedges and wall 18*a* to avoid any pressure on or damage to the wedges.

Figure 4:
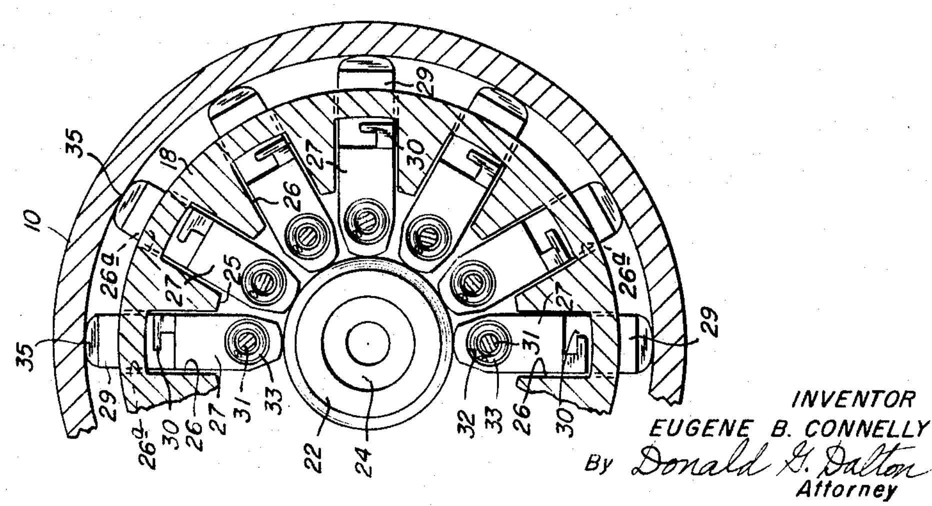
FIGURE 4 is a partial vertical section taken along the line IV—IV of FIGURE 3.

When the parts are in the positions shown in Figures 3 and 4, the mandrel assembly has ceased moving to the left into pipe end 10 when outwardly projecting annular shoulder 19, disposed adjacent hub 18 has abutted against the pipe end. This seals the apparatus from debris incident to the subsequent threading of the pipe end. Thruster 21 has been moved to the right, thereby permitting compression springs 33 to expand and to move wedges 27 axially to the right in slots 26. Wedges 27 have engaged flange 23 thereby moving sleeve 22 to the right. Fingers 29 sliding in tongue and groove joints 30 have moved radially outwardly in slots 26*a* until arcuate extensions 35 thereon have abutted against the interior wall of pipe end 10. The outer edges of extensions 35 on the right-hand ends of fingers 29 are preferably arcuate and are restricted in length to provide line contact with and support for the pipe wall, despite some irregularity therein. Extensions 35 are preferably spaced from the left-hand face of annular shoulder 19 to assure wall support close to the right-hand end of pipe 10 where maximum deflection will occur.

A clearance space 36 between the right-hand end of the two wedges 27 shown in Figure 3 and flange 23 indicates the existence of a variation in the inside diameter of the pipe wall. There has been sliding engagement between the exterior surface of sleeve 22 and some wedges 27 until a last wedge 27 (not shown) has moved against flange 23 and the arcuate extension 35 on its corresponding finger 29 has abutted against the interior wall of pipe end 10, thereby completing the expansion operation. In other words, as each individual extension 35 contacts the interior of the pipe, its radial movement is arrested. Hence, the axial movement of its interlocked wedge 27 is also arrested. Since some extensions 35 have not yet contacted the pipe, their movement will continue and cause the sliding engagement between the arrested wedges and sleeve 22. Further, in order to provide for any irregularities in the inside diameter of pipe end 10 and to assure abutment thereagainst of all arcuate extensions 35, the thruster 21 should be moved axially to the right a sufficient distance to provide a clearance space 38 between flange 24 on sleeve 22 and the thruster.

When the parts are in the positions shown in FIGURES 3 and 4 the pipe end is ready for taper turning and threading. It can be seen that a vertical cross section including extensions 35 becomes substantially a solid and is therefore very resistant to any radial machining pressures. This cross section includes the pipe wall, extensions, fingers, wedges, sleeve, and thruster. The latter is supported on its opposite side by the sleeve, wedges, fingers, radial extensions, and pipe wall. Since the acute angle to the hub axis of the outer edges of the wedges, hence that of tongue and groove joints 30, is less than the angle of repose for the metal of these parts, any radial force of machining will be transmitted directly through the extensions, fingers and wedges to the sleeve without causing any wedge to move away or back off.

Figure 5:
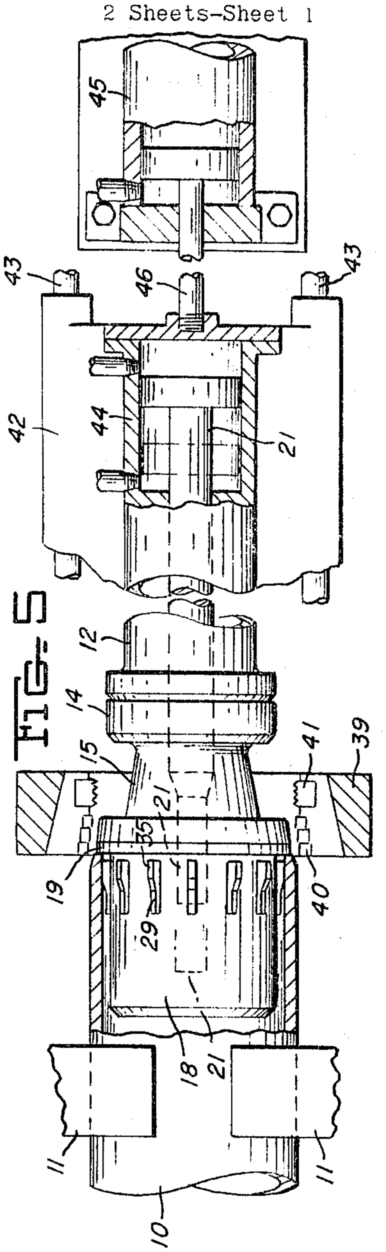
FIGURE 5 is a schematic plan view, with parts omitted for clarity, showing my mandrel and its operating mechanism cooperating with a pipe-threading machine.

The apparatus of FIGURE 5 cooperates with and is mounted on the frame (not shown) of a conventional threading machine, including a driven tool-carrying head or ring 39 and its taper-turning tools 40 and thread chasers 41. My mandrel assembly is disposed axially in the quill (not shown) which drives head 39 for engagement with pipe length 10, gripped in the jaws of a chuck 11 and thus held stationary. A slide or carriage 42 movable in ways 43 mounts a fluid pressure cylinder 44. Sleeve 12 extends forwardly from one end of cylinder 44 and has thruster 21 slidable therein. Thruster 21 is shown as integral with the piston rod of cylinder 44. A fluid-pressure cylinder 45 has its piston rod 46 connected to cylinder 44 for moving the latter toward and from the end of the pipe length.

In operation, slide 42 is retracted by cylinder 45 while the pipe length is being positioned in chuck 11 for tapering and threading. Tool head 39 is likewise retracted. Before the pipe has been clamped, cylinder 44 with its piston rod (thruster) 21 advanced, is advanced by cylinder 45 to insert the contracted mandrel assembly of FIGURES 1 and 2 in the pipe end by abutting shoulder 19 against the latter. Thereafter, cylinder 44 is operated to retract its piston rod. This retracts thruster 21 and permits springs 33 to move wedges 27 axially and slide fingers 29 radially outwardly until their arcuate extensions 35 engage with the interior of the pipe wall as shown in FIGURES 3 and 4. The pipe is clamped by chuck 11 and the tool head 39 is then driven and advanced toward the pipe to effect the desired tapering and threading. When this is completed, tool head 39 is retracted and piston rod or thruster 21 is again advanced to contract the mandrel assembly as shown in FIGURES 1 and 2. Thereafter, retraction of piston rod 46 withdraws the assembly from pipe end 10.

The advantage of the mandrel of my invention is that it assures that the thread formed on the end of a pipe length will be truly circular, despite any pipe-end irregularities or chucking pressures. The improved mandrel also materially reduces the pipe vibration incident to high-speed threading operations. The mandrel is expanded or contracted by light axial forces, but when expanded, resists radial forces effectively without danger of wedge movement. The forces of mandrel expansion are by pressure springs and not by hydraulic pressure means, which if accidentally excessive may damage the mandrel parts or expand the thin wall of a pipe end.

Although I have disclosed herein the preferred embodiment of my invention, I intend to cover as well any change or modification therein which may be made without departing from the spirit and scope of the invention.

I claim:

1. An expanding mandrel comprising a hub, an outwardly projecting shoulder disposed adjacent one end of the hub so as to be engageable by a pipe end, a thruster coaxial with said hub and movable longitudinally thereof, a sleeve coaxial with and slidable on said thruster, having an external flange at one end, the interior of said hub having axial slots spaced circumferentially thereof, and slots extending radially through said hub for a limited portion of its length near one end thereof, wedges slidable axially in said axial slots, one end of said wedges being engageable by said flange, the outer edges of said wedges lying at an acute angle to the axis of said hub, fingers having sliding engagement with the outer edges of said wedges and movable radially in the radial extensions of said slots, compression springs extending between said hub and wedges, tending to effect axial movement of said wedges in such a direction as to move said fingers radially outwardly to engage the interior of said pipe end, said thruster being adapted to bottom in said sleeve thereby to move said sleeve and wedges axially against the force of said springs, whereby said fingers are moved radially inwardly, said angle being such that friction between said wedges and fingers prevents displacement of said wedges by radial pressure thereon.

2. Apparatus as defined in claim 1, characterized by said sleeve having an internal flange at the opposite end thereof adapted to be engaged by said thruster, thereby to move said sleeve and wedges axially against the force of said springs.

3. Apparatus as defined in claim 1 characterized by said wedges being slidable on the exterior surface of said sleeve.

References Cited

UNITED STATES PATENTS

| | | | |
|---|---|---|---|
| 2,174,866 | 10/1939 | Barnes | 279—2 |
| 3,086,783 | 4/1963 | Kelso | 10—107 XR |

LEONIDAS VLACHOS, *Primary Examiner.*